United States Patent [19]

Cording et al.

[11] 4,355,305

[45] Oct. 19, 1982

[54] RESOLVER PROCESSOR WITH ERROR DETECTION

[75] Inventors: Richard W. Cording, Mishawaka, Ind.; Daniel D. Morton, Farmington Hills, Mich.

[73] Assignee: The Bendix Corporation, Southfield, Mich.

[21] Appl. No.: 143,218

[22] Filed: Apr. 24, 1980

[51] Int. Cl.³ ............................................ H03K 13/02
[52] U.S. Cl. .............................. 340/347 SY; 318/565; 340/347 M; 340/347 AD; 340/870.31
[58] Field of Search ....... 340/347 M, 347 SY, 870.31, 340/870.32; 318/565, 661, 569, 605

[56] References Cited

PUBLICATIONS

Schmid, Electronic Analog/Digital Conversions, Van Nostrand Reinhold Co., 1970, pp. 434-437.
The Engineering Staff of Analog Devices, Inc., Analog-Digital Conversion Handbook, 6/72, pp. II-10 to II-12.

Primary Examiner—Thomas J. Sloyan
Attorney, Agent, or Firm—William A. Marvin; Ken C. Decker

[57] ABSTRACT

A digital resolver processor measures the angle of a rotatable device. A resolver connected to the rotatable device generates sinusoidal signals as a function of an excitation signal and of the resolver angle. A phase shift network receives the sinusoidal signals and generates leading and lagging phase shifted signals with a relative phase shift proportional to resolver angle. A counter is enabled by the leading signal and inhibited by the lagging signal so that the contents of the counter represents the relative phase shift, and thus, the angle of the rotatable device. The angular position of the resolver is limited so that the contents of the counter is maintained within a predetermined range in the absence of a fault condition of the resolver terminals. The contents of the counter is forced outside the predetermined range in response to short or open circuit conditions of the resolver terminals, so that misleading angle representations may be recognized as such.

16 Claims, 12 Drawing Figures

RESOLVER PROCESSOR WITH ERROR DETECTION

This invention relates to electronic circuitry for measuring the angular position of a rotatable device. The electronic circuitry is particularly applicable in an aircraft engine control system.

BACKGROUND OF THE INVENTION

An aircraft gas turbine engine includes rotary mechanical devices such as vanes and rotary fuel valves. To control the operation of such an engine by an electronic control unit, it is necessary to electronically monitor the angular position of these devices. If a microprocessor is utilized as the engine control "brain", an angle sensing mechanism with a digital output may be interfaced directly to the microprocessor. A resolver with relatively rotatable coils may be used as the analog angle sensor. However, short and open circuit conditions of the resolver terminals can cause the associated resolver processor to produce misleading angle indications. These midleading angle indications may have a detrimental effect on the control of the engine. Therefore, an angle measuring circuit which has the capability of recognizing fault conditions of the resolver terminals is desired.

SUMMARY OF THE INVENTION

An advantage of this invention is that the resolver processor provides a digital output which may be directly interfaced with a microprocessor control unit in an engine control system.

Another advantage of applicants' invention is that it recognizes misleading angle indications caused by failures of the resolver internal wriring, terminals, or of the wiring to the resolver.

Accordingly, the present invention includes a resolver with a fixed non-rotating coil excited by a sinusoidal excitation voltage and a pair of rotatable coils mounted for rotation with the rotatable device. In response to the excitation voltage, phase shift networks which are connected to the rotatable coils produce leading and lagging signals, with a relative time delay or phase shift therebetween proportional to the angle of the rotatable device with respect to a chosen reference position. Comparators generate start and stop signals in response to zero crossings of the leading and lagging signals, respectively. A binary counter is enabled by the start signal and inhibited by the stop signal so that the contents of the counter is proportional to the time delay, and thus to the angle of the rotatable device. Control logic circuitry is provided so that periodic angle meansurements of a plurality of rotatable devices may be performed. Fault detection logic is provided so that erroneous angle indications caused by resolver terminal failure conditions may be recognized.

DETAILED DESCRIPTION

Figure 1:
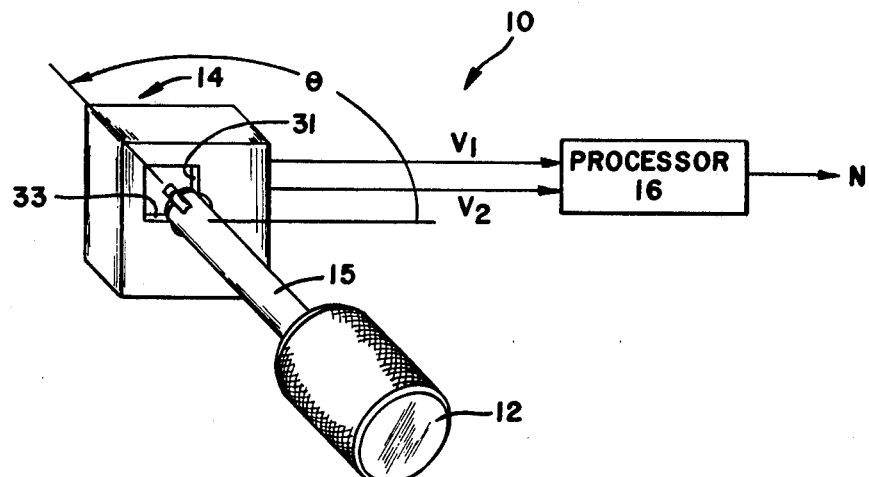
FIG. 1 is a block diagram of an electronic angle measuring system.

A resolver processor system 10 of FIG. 1 includes a rotatable device 12 connected to a resolver 14 by a shaft 15. The resolver 14 generates output signals V1, V2 which are functions of an excitation signal Vex and of the angular position $\theta$ of the rotatable device 12. A zero crossing resolver processor 16 receives the output signals V1, V2 from the resolver 14 and generates, as described later, a count N, proportional to the angular position O of the rotatable device 12.

Figure 2:
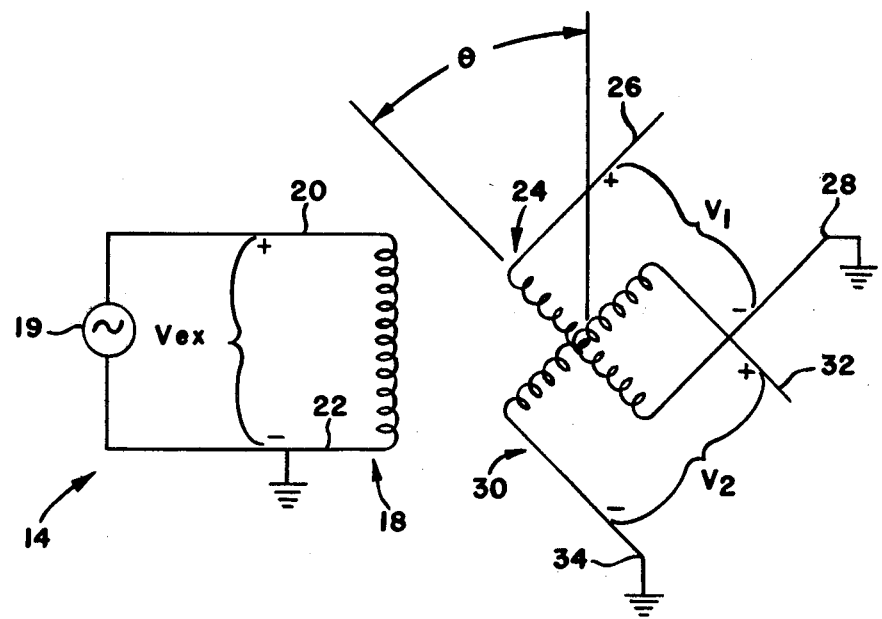
FIG. 2 is a schematic view of resolver for use with applicants' invention.

Referring to FIG. 2, resolver 14 includes a fixed excitation coil 18. An excitation signal source 19 applies a sinusoidal excitation signal $Vex = V \sin(2\pi ft)$, with voltage amplitude V and frequency f across terminals 20 and 22 of coil 18. A first resolver output coil 24 includes a signal terminal 26 and a grounded terminal 28. A second resolver output coil 30 includes a signal terminal 32 and a grounded terminal 34. Output coils 24 and 30 are fixed relative to shaft 15 and rotatable device 12. Output coils 24 and 30 are also oriented at right angles to each other. The angle $\theta$ is defined as the relative angle between fixed resolver coil 18 and rotating resolver coil 24. The angular position of shaft 15 may be limited by stops 31 and 33 (see FIG. 1) so that the angle $\theta$ between coils 18 and 24 is similarly limited. The electromagnetic coupling between the fixed coil 18 and rotating coils 24, 30 varies with the angle $\theta$ in a well-known manner. For example, the coupling between fixed coil 18 and rotating coil 24 is a maximum where the coils are parallel to one another and a minimum when the coils are perpendicular. The coupling between coil 18 and coil 30 may be similarly described. Therefore, resolver 14 generates output signals V1 proportional to $V \sin(2\pi ft) \times \cos \theta$ and V2 proportional to $V \sin(2\pi ft) \times \sin \theta$ across the terminals of resolver output coils 24 and 30, respectively. The resolver processor 16 receives the resolver output signals V1 and V2 as shown in FIG. 3.

Figure 4:
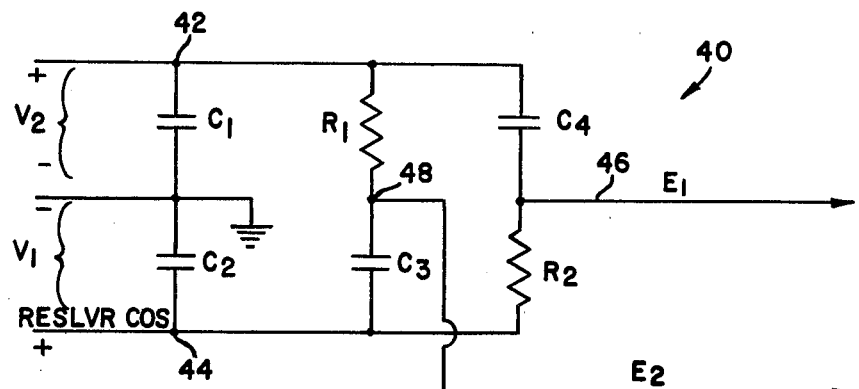
FIG. 4 is a schematic view of a phase shift network.
Figure 9:
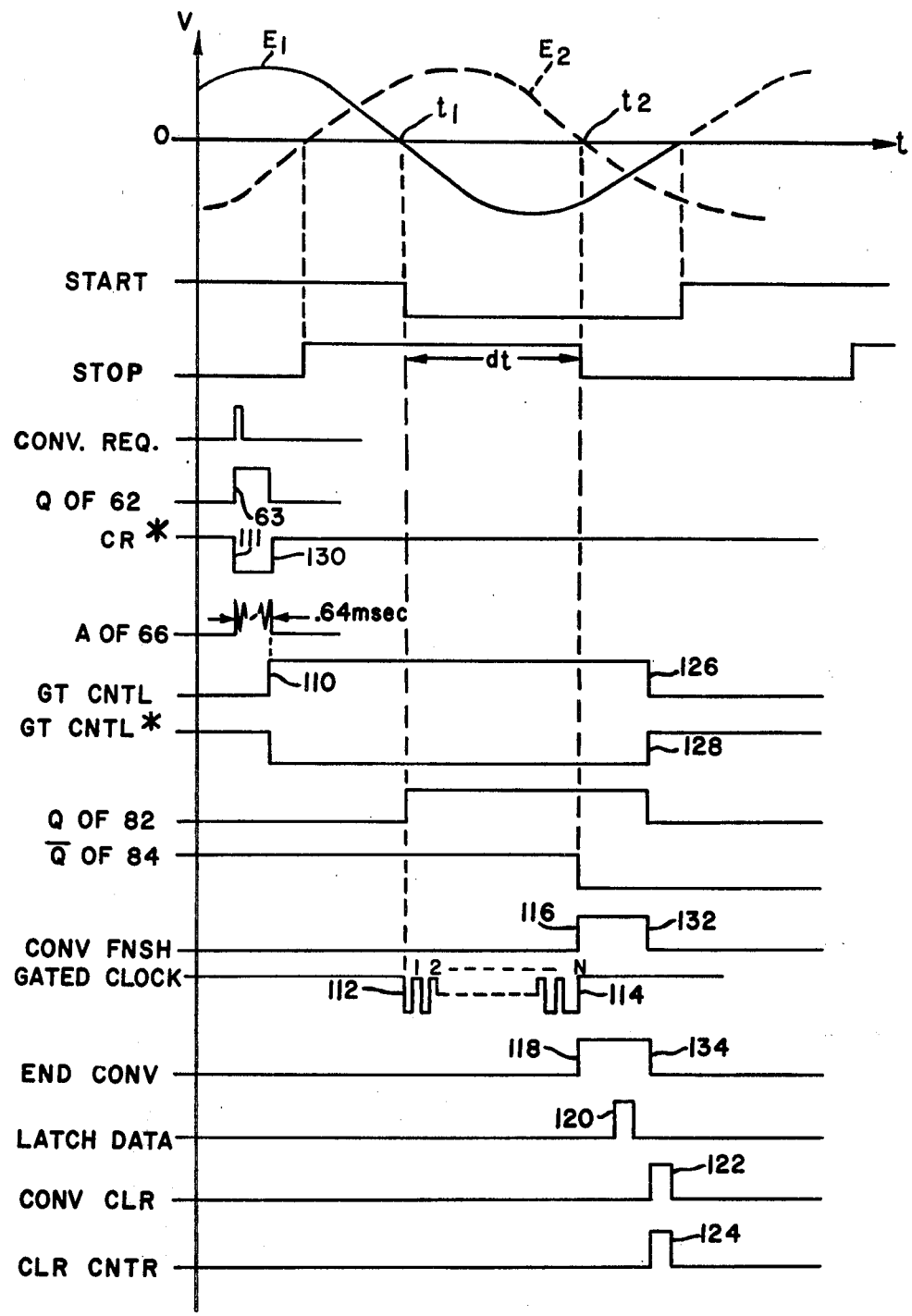
FIG. 9 is a waveform diagram of signals produced by applicants' invention during normal operation.

The resolver processor 16 includes a RC phase shift network 40 as shown in FIG. 4, with input terminals 42 and 44 connected to terminals 32 and 26 of the resolver 14, respectively. Network 40 includes a pair of filter capacitors C1 and C2 connected between a grounded terminal and terminals 42 and 44, respectively. A resistor R1 is connected between terminal 42 and an output terminal 48. A capacitor C3 is connected between terminal 48 and terminal 44. A resistor R2 is connected between terminal 44 and an output terminal 46. A capacitor C4 is connected betwen terminal 46 and terminal 42. In response to the sinusoidal resolver output signals V1 and V2 applied to terminals 44 and 42, the RC phase shift network 40 generates a leading (in the phase or time domain) sinusoidal signal E1 proportional to V sin $(2\pi ft - 45° + \theta)$ at terminal 46 and a lagging (in the phase or time domain) sinusoidal signal E2 proportional to V sin $(2\pi ft + 45° - \theta)$ at terminal 48. From these equations it is clear that the amount of relative phase shift or time delay between leading and lagging signals E1 and E2 is proportional to the angle $\theta$. It also follows that the time delay between the zero crossings of the phase shifted signals E1 and E2, as at time t=t1 and t=t2 in FIG. 9, is also proportional to the angle $\theta$. For example, when $\theta = 45°$, E1 and E2 are in phase, and when the value of $\theta$ approaches 225° then the relative phase shift between E1 and E2 approaches a maximum of 360°. Due to these relationships proper angle measurements are possible only over an angle range of 180° (225° less 45°). Therefore, it is necessary to physically restrict the possible angular positions of the rotating coils 24 and 30 of resolver 14 to within this 180° range.

Figure 3:
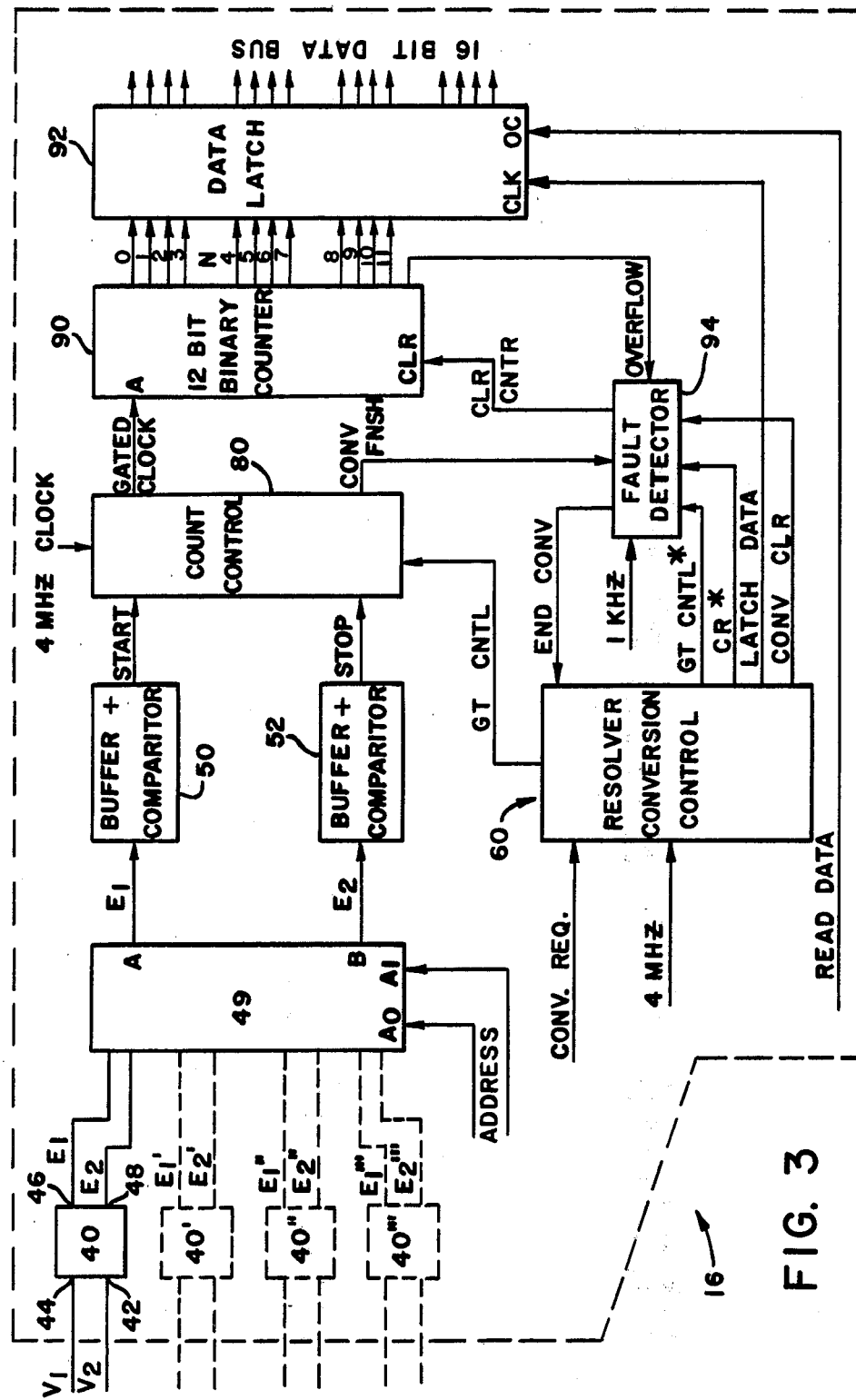
FIG. 3 is a block diagram of applicants' resolver processor.

Signals from a plurality of resolvers (not shown) may be accommodated by additional phase shift networks such as 40', 40" and 40'" shown in dashed lines in FIG. 3. A multiplexer 49, such as a Harris type HI-509A analog multiplexer, selectively couples a particular pair of the phase shifted signals E1 and E2 to its output terminals A and B in response to ADDRESS signals applied to its A0 and A1 inputs. In this case, the A and B output terminals of multiplexer 49 are connected to inputs of respective buffer and comparator networks 50 and 52. If only a single resolver 14 is to be monitored, then the multiplexer 49 may be dispensed with and terminals 46 and 48 of phase shift network 40 may be connected directly to the respective buffer and comparator networks 50 and 52.

Figure 5:
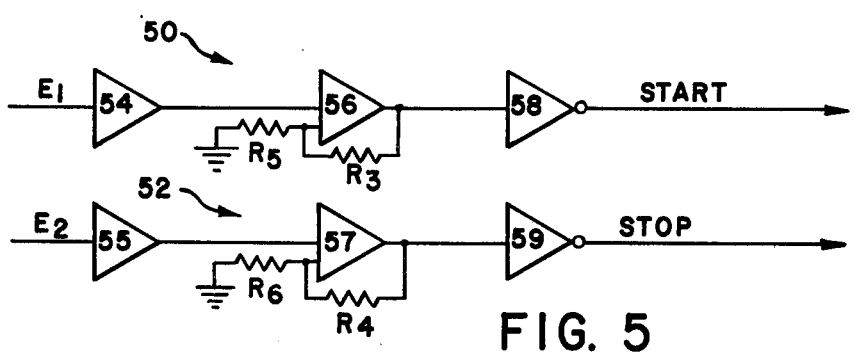
FIG. 5 is a schematic diagram of buffer and comparator networks.

Phase shifted sinusoidal signals E1 and E2 are received by buffer and comparator circuits 50 and 52, respectively. Each of circuits 50 and 52, as shown in detail in FIG. 5, includes unity amplifiers or buffers 54, 55 which protects the remaining circuit from potentially destructive high voltage surges without loading the phase shift network. The outputs of buffers 54, 55 are connected to the respective inputs of comparators 56, 57. Relatively high impedance resistors R3 and R4 are connected between the outputs and other inputs of comparators 56 and 57. Relatively low impedance resistors R5 and R6 are connected between ground and the other inputs of comparators 56 and 57. This provides the comparators with a small offset voltage to reduce the possibility of the comparators being triggered by low level noise during the negative-to-positive transitions of the leading and lagging signals E1 and E2. The outputs of comparators 56, 57 change from logic 1 to logic 0 when their input voltages make a negative transition through zero volts. The outputs of comparators 56, 57 change from logic 0 to logic 1 when their input voltages make a positive transition through the offset voltage. The outputs of comparators 56, 57 are connected to the inputs of inverting Schmitt-Triggers 58, 59 which, without multiple triggering, produce START and STOP signals which are compatible with transistor-transistor logic (TTL). The START and STOP signals are produced at the zero crossings of the phase shifted signals E1 and E2, as shown in FIG. 9. Since the time delay or phase shift between zero crossings of the phase shifted signals E1 and E2 is proportional to the angle $\theta$, it follows that the time delay, dt, between the negative transitions of the START and STOP signals is proportional to the phase shift between phase shifted sinusoidal signals E1 and E2, and that the time delay dt is also proportional to the angle $\theta$ of the resolver 14.

Figure 6:
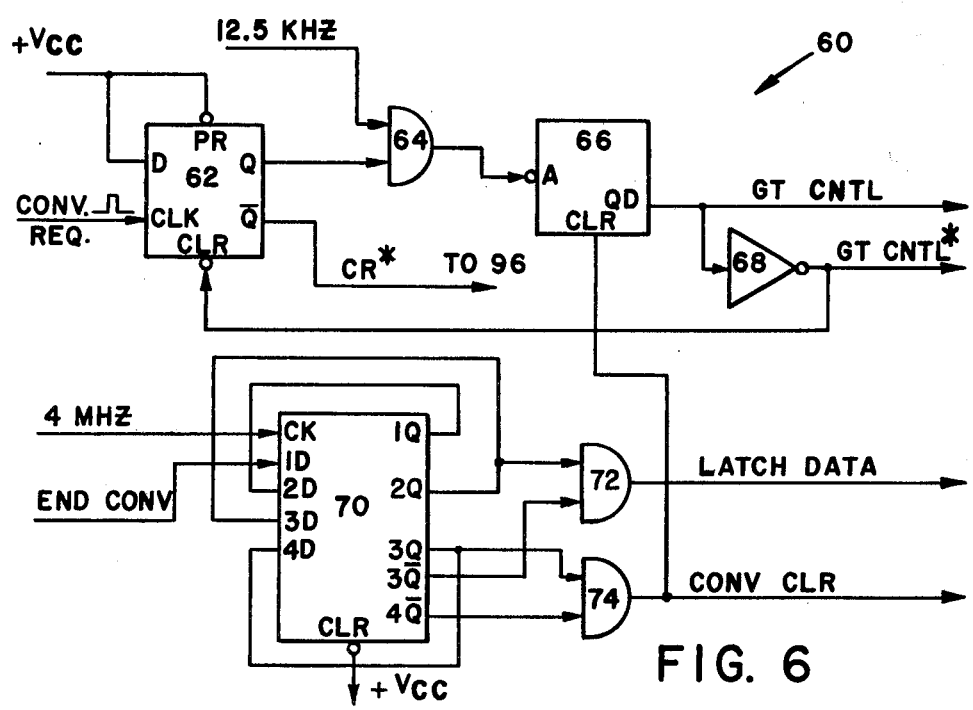
FIG. 6 is a schematic diagram of the resolver conversion control portion of applicant' invention.

A resolver conversion control unit 60 is shown in detail in FIG. 6. Conversion control unit 60 includes a Dual D flip-flop 62 with clear and preset inputs, such as a Texas Instruments' 54LS74A flip-flop. The preset and D inputs are connected to a positive DC voltage source +Vcc. The clock input is connected to receive a conversion request (CONV REQ) pulse generated by a control unit or "brain" (not shown). The Q output is connected to an input of AND gate 64. The $\overline{Q}$ output of flip-flop 62 generates a CR* signal as the inverse of the signal generated as the Q output thereof. The other input of AND gate 64 is connected to a 12.5 KHz frequency source (not shown). The output of AND gate 64 is connected to the inverting A input of a dual 4 bit binary counter 66 such as a Texas Instruments' type 54 LS393 counter. The QD output of counter 66 is connected to an input of inverter 68. The output of inverter 68 is connected to the inverted clear input terminal CLR of flip-flop 62. Control unit 60 also includes a Quadruple D-type flip-flop 70 with a clear function such as a Texas Instruments' type 54LS175 flip-flop. The clock input, CK of flip-flop 70 is connected to a 4 MHz frequency source (not shown). The 1D input of flip-flop 70 receives an end conversion signal (END CONV) generated by fault detector circuit 94 as described in detail later. The inverting clear input terminal (CLR) of flip-flop 70 is connected to DC voltage source +Vcc. The 1Q output is connected to the 2D input, the 2Q output is connected to the 3D input and to an input of AND gate 72. The $3\overline{Q}$ output is connected to the 4D input and to an input of AND gate 74. The 3Q output is connected to the other input of AND gate 72 and the $4\overline{Q}$ output is connected to the other input of AND gate 74. The output of AND gate 74 is connected to the clear input (CLR) of counter 66.

The operation of control unit 60 will now be described with reference to FIG. 6 and to the waveform diagram of FIG. 9. The Q output of flip-flop 62 changes state as indicated by reference numerals 63 in FIG. 9 in response to the leading edge of a CONV REQ pulse applied to the CLK input of flip-flop 62. The $\overline{Q}$ output of flip-flop 62 simultaneously changes state. The gated 12.5 KHz signal at the output of AND gate 64 is thus applied to the A input of counter 66 as long as the Q output of flip-flop 62 is a logic 1. The QD output of counter 66, hereinafter designated the Gate Control (GT CNTL) signal changes from logic 0 to logic 1 after eight periods of the gated 12.5 KHz signal or 0.64 msec after the CONV REQ pulse. The purpose of this time delay between the leading edge of the CONV REQ signal and the state change of the GT CNTL signal is to allow for the finite time required by multiplexer 49 to perform its switching operation which connects the signals from the appropriate phase shift network to the buffer and comparators 50 and 52. Similarly, the output of inverter 68 (GT CNTL*) changes from 1 to 0 as the GT CNTL signal changes from 0 to 1. The 1 to 0 transition of GT CNTL* is applied to the CLR input of flip-flop 62, thus causing the $\overline{Q}$ output and the Q output, CR*, of flip-flop 62 to toggle back to their original logic 0 and logic 1 states, respectively. The return of the Q output to logic 0 removes the gated 12.5 KHz signal from the A input of counter 66 while the GT CNTL and GT CNTL* signals remain in logic 1 and 0 states, respectively.

Figure 10:
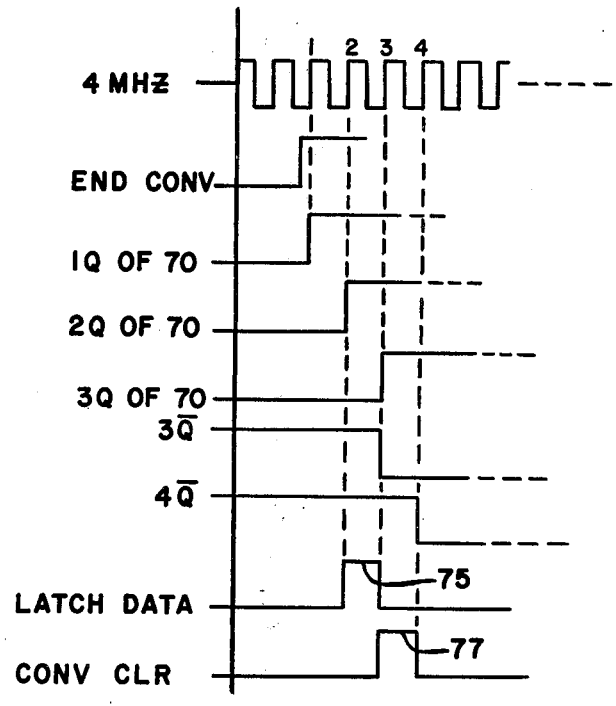
FIG. 10 is a waveform diagram of signals at various points in the resolver conversion control portion of applicants' invention.

The operation of flip-flop 70 and AND gates 72 and 74 can be best understood with reference to FIG. 6 and to the waveform diagram of FIG. 10. An END CONV signal, (the generation of which is described later with respect to fault detector circuit 94) is applied to the 1D input terminal of flip-flop 70. When the END CONV signal toggles from 0 to 1, the 1Q output of flip-flop 70 toggles high on the first 0 to 1 transition of the 4 MHz signal following the 0 to 1 transition of the END CONV signal. The 2Q output switches from 0 to 1 on the second 0 to 1 transition of the 4 MHz signal. The 3Q output toggles 0 to 1 on the third 0 to 1 4 MHz transition and the $3\overline{Q}$ is the inverse of the 3Q output. The $4\overline{Q}$ output toggles from 1 to 0 on the fourth 0 to 1 4 MHz transition. The output of AND gate 72, hereinafter designated LATCH DATA, is high only when the 2Q and $3\overline{Q}$ outputs are both high. The output of AND gate 74, hereinafter designated conversion clear (CONV CLR), is high only when the 3Q and $4\overline{Q}$ outputs are both high. Thus, in response to the state change of the END CONV signal, resolver conversion control circuit 60 generates a LATCH DATA pulse at the output of AND gate 72, and 250 nanoseconds later generates a CONV CLR pulse at the output of AND gate 74, as indicated by reference numerals 75 and 77, respectively, of FIG. 10.

Figure 7:
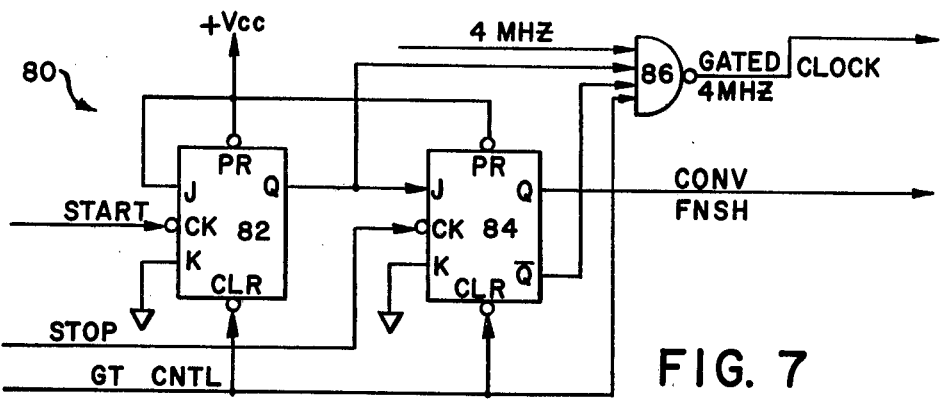
FIG. 7 is a schematic diagram of the count control portion of applicants' invention.

Resolver processor 16 also includes a count control circuit 80 shown in detail in FIG. 7. Count control circuit 80 includes a pair of dual J-K flip-flops 82 and 84 with clear and preset such as Texas Instruments' type 54LS112A flip-flops. The preset inputs (PR) of both flip-flops 82 and 84 and the J input of flip-flop 82 are connected to voltage +Vcc. The gate control (GT CNTL) signal, which is generated at the QD output of counter 66 as described previously, is applied to the clear inputs CLR of flip-flops 82 and 84 and to an input of NAND gate 86. The K inputs of both flip-flops 82 and 84 are grounded. The clock input CK of flip-flop 82 receives the START signal. The Q output of flip-flop 82 is connected to the J input of flip-flop 84 and to another input of NAND gate 86. The clock input CK of flip-flop 84 receives the STOP signal. The $\overline{Q}$ output of flip-flop 84 is connected to a third input of NAND gate 86. The last input of NAND gate 86 receives the 4 MHz signal.

The operation of the count circuit 80 may best be understood with reference to FIG. 7 and to the waveform diagram of FIG. 9. The Q output of flip-flop 82 is normally low or logic 0 because it is held cleared by the GT CNTL signal. However, it changes from 0 to 1 in response to the first negative transition of the START signal applied to its CK input after the GT CNTL signal has gone from a 0 to 1. Similarly, $\overline{Q}$ of flip-flop 84 is normally logic 1, but changes from 1 to 0 in response to a negative transition of the STOP signal applied to its CK input if the J input of flip-flop 84 is in a logic 1 state. The Q output signal of flip-flop 84, hereinafter designated CONV FNSH, is the inverse of its $\overline{Q}$ output signal. The output of NAND gate 86 is a gated 4 MHz pulse train (GATED CLOCK) only when the GT CNTL, Q of 82 and the $\overline{Q}$ of 84 signals are at logic 1 levels as shown in FIG. 9. If either of the GT CNTL, Q of 82 or $\overline{Q}$ of 84 signals are at logic 0 level, then the output of NAND gate 86 remains constant at a logic 1 level. Because the Q output of flip-flop 82 is connected to the J input of flip-flop 84, it is assured that the GATED CLOCK signal always begins with the START pulse and ends with a STOP pulse, rather than vice versa. This connection also assures that the STOP signal will have no effect unless a START signal is first applied to flip-flop 82. When the GT CNTL signal returns to logic 0, flip-flops 82 and 84 are cleared. Flip-flops 82 and 84 then ignore further START and STOP pulses until the GT CNTL signal returns to logic 1 in response to another CONV REQ signal.

The A input of a 12 bit binary counter 90 receives the gated 4 MHz clock signal (GATED CLOCK) from the output of NAND gate 86. The outputs of all 12 data bits of counter 90 may be cleared by the application of a clear counter (CLR CNTR) signal, the generation of which is described later, to the CLR input of counter 90. An output signal, hereinafter designated OVRFLW, is generated by counter 90 after 4096 cycles of the 4 MHz gated clock signal. The outputs of the bits of counter 90 are connected to respective inputs of a data latch 92. A binary number may be latched into data latch 92 from counter 90 by applying the LATCH DATA pulse, generated at the output of AND gate 72, to the clock (CLK) input terminal of data latch 92. A binary number in data latch 92 may be transferred to a data bus (not shown) by applying a READ DATA pulse, received from the electronic "brain" (not shown), to the output control (OC) input terminal of data latch 92.

Figure 8:
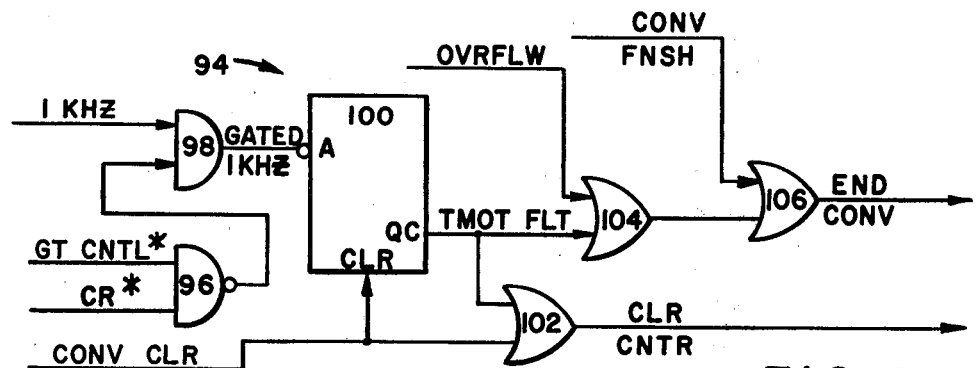
FIG. 8 is a schematic diagram of the fault detector portion of applicants' invention.

A fault detector circuit 94 is illustrated in detail in FIG. 8. Fault detector 94 includes a NAND gate 96 with a first input connected to the $\overline{Q}$ output of flip-flop 62. The second input of NAND gate 96 is connected to the output of inverter 68 of resolver conversion control circuit 60. In this manner, the first and second inputs of NAND gate 96 receive the CR* and GT CNTRL* signals, respectively, which are generated by control circuit 60, as previously described. The output of NAND gate 96 is connected to an input of AND gate 98. The other input of AND gate 98 is connected to the output of a 1 KHz frequency source (not shown). The output of AND gate 98 is connected to the clock input (A) of a 4 bit binary counter 100 such as a Texas Instruments' 54LS393 counter. The signal generated at the QC output of counter 100, hereinafter designated TMOT FLT, changes state upon the fourth negative transition of the signal applied to its clock input A. The CONV CLR signal from the output of AND gate 74 of resolver conversion control circuit 60 is applied to the clear (CLR) input of counter 100 and to an input of OR gate 102. The QC output of counter 100 is connected to the other input of OR gate 102 and to an input of OR gate 104. The output of OR gate 102, which generates a CLR CNTR signal, is connected to the clear input (CLR) of binary counter 90. The other input of OR gate 104 is connected to an output of the binary counter 90 and receives the OVRFLW signal therefrom. The output of OR gate 104 is connected to an input of OR gate 106. The other input of OR gate 106 is connected to the Q output of flip-flop 84 of count control circuit 80. The output of OR gate 106, which generates an END CONV signal, is connected to the 1D input of flip-flop 70 of resolver conversion control circuit 60.

NORMAL MODE OF OPERATION

Since the contents and operation of each of the functional units 40, 49, 50, 52, 60, 80, 90 and 92 (grouped together as resolver processor 16 in FIG. 3) has been described in detail hereinbefore, the following operational description will concentrate upon the operation of fault detector circuit 94 and upon the overall cooperation of these functional units, rather than their internal operation, in order to more clearly describe how these functional units cooperate to generate a number N representing the angle $\theta$ of the rotatable device 12. For an understanding of the internal operation of these functional units, the reader is advised to refer back to the preceding detailed description of each unit.

In order to measure the angular position $\theta$ of the rotatable device 12, the excitation signal:

$$V_{ex} = V \sin(2\pi\, ft)$$

is applied to the non-rotating coil 18 of a resolver 14 with rotatable coils 24 and 30 fixed to the rotatable device 12. If there are no short or open circuit conditions at resolver terminals 20, 22, 26, 28, 32, or 34, then voltages V1 and V2 appear across output coils 24 and 30, respectively, of resolver 14. Voltages V1 and V2 are represented by the following equations:

$$V1 = V \sin(2\pi\, ft) \cos\theta$$

and $$V2 = V \sin(2\pi\, ft) \sin\theta$$

Voltages V1 and V2 are then applied to inputs terminals of RC phase shift network 40 of resolver processor circuit 16 as shown in FIG. 3. Voltages V1 and V2 are phase shifted by RC phase shift network 40 to obtain a leading signal:

$$E1 = V \sin(2\pi\, ft - 45° + \theta)$$

and a lagging signal:

$$E2 = V \sin(2\pi\, ft + 45° - \theta)$$

as shown in the uppermost portion of FIG. 9. The leading signal E1 has a negative zero crossing at $t = t1$ while the lagging signal E2 has a negative zero crossing at $t = t2$. As described previously, the time delay dt, between t1 and t2 is proportional to the angle $\theta$ of the rotatable device 12. The buffer and comparator networks 50 and 52 cause negative state changes of the START and STOP signals at $t = t1$ and $t = t2$, respectively, as also shown in FIG. 9.

In order to derive the angle representation, N from these START and STOP signals, a CONV REQ pulse must be applied to an input of the resolver conversion control circuit 60. In response to the CONV REQ pulse, conversion control circuit 60 causes a 0 to 1 state change of the GT CNTL signal at an output thereof, as shown at 110 in FIG. 9. Conversion control circuit 60 also causes a 1 to 0 transition of the CR* signal, as at 111, at the output of flip-flop 62 in response to the leading ledge of the CONV REQ pulse. When the GT CNTL signal is high, then the count control circuit 80 is able to respond to the next sequence of START and STOP signals. In this case, the high GT CNTL signal causes the count control circuit 80 to begin generating a 4 MHz clock signal (GATED CLOCK) in response to the negative transition of the START signal circuit at time $t = t1$ and as shown at 112 of FIG. 9. The 12 bit binary counter 90 begins counting at a 4 MHz rate in response to the GATED CLOCK signal. The count control circuit 80 continues to produce the GATED CLOCK signal until the negative transition of the STOP signal occurs at time $t = t2$, whereupon the count control circuit 80 terminates the GATED CLOCK signal as at 114 and at which time count control circuit 80 also causes a 0 to 1 transition of the CONV FNSH signal as at 116. At this point the contents, N, of counter 90 is proportional to the angle $\theta$ since counter 90 has been counting at a constant 4 MHz rate during the time interval dt, between time t1 and t2 which, as previously described, is proportional to the angle $\theta$.

Now, the 0 to 1 transition of the CONV FNSH signal causes a similar transition of the END CONV signal, as as 118, by means of OR gate 106 of fault detector circuit 94. The END CONV signal in turn causes resolver conversion control circuit 60 to generate a LATCH DATA pulse, as at 120, and a CONV CLR pulse, as at 122, the CONV CLR signal being slightly delayed with respect to the LATCH DATA pulse. The LATCH DATA pulse is applied to the CLK input of data latch or storage device 92 to cause the contents N, of counter 90 to be transferred into the data latch 92. The delayed CONV CLR pulse is applied to OR gate 102 of fault detector circuit 94, which in turn generates a CLR CNTR pulse as shown at 124. The CLR CNTR pulse is applied to the CLR input of counter 90 to clear the contents of counter 90 to N=0 so that counter 90 is then ready to begin a new count during the next conversion sequence. In normal operation the CONV CLR pulse is necessarily delayed with respect to the LATCH DATA pulse to insure that the contents of counter 90 latched into data latch 92 before counter 90 is cleared to zero. In this manner the number N representing the angle $\theta$ is stored in data latch 92 from which it can be retrieved by the application of a READ DATA pulse to the OC input thereof.

The CONV CLR pulse is also applied to the clear input of counter 66 of resolver conversion control circuit 60, as seen in FIG. 6, which responds by causing the GT CNTL and GT CNTL* signal to change state as at 126 and 128 of FIG. 9. The state change of the GT CNTL* signal in turn is applied to the CLR input of flip-flop 62, thus taking away the active clear and allowing the flip-flop outputs to respond to the next CONV REQ signal. The state change of the GT CNTL signal is applied to the CLR inputs of flip-flops 82 and 84 thus resetting count control circuit 80 and holding it clear so that the next series of START and STOP signals has no effect until the next conversion cycle. The state change of the GT CNTL signal also causes flip-flop 84 to toggle the CONV FNSH signal back to its original logic zero value as at 132. The transition of the CONV FNSH signal is applied to OR gate 106 of fault detector 94, thus causing a similar transition of the END CONV signal as at 134. At this point the resolver conversion control circuit 60, the count control circuit 80, the binary counter 90 and the fault detector circuit 94 are ready to begin a new angle measurement sequence in response to a new CONV REQ pulse.

It should be noted that the particular frequencies are mentioned herein for the purposes of example only, and that the operation of applicants' invention is not restricted to these particular frequencies.

FAILURE MODE OF OPERATION

The maximum time separation of the zero crossings of the phase shifted signals E1 and E2 will necessarily be the period (1/f) of the excitation signal Vex because this period is also the period of phase shifted signals E1 and E2, as previously defined. If an excitation signal frequency of 1 KHz is used, then this maximum time separation will be 1 msec. It follows that the maximum number N to which the counter 90 can count is equal to 1 msec multiplied by the rate or frequency at which the counter 90 counts. If this rate is 4 MHz, as hereinbefore mentioned with respect to the GATED CLOCK signal, then the maximum number N to which counter 90 can count is N=4000. As noted earlier, when $\theta=45°$, then E1 and E2 are in phase so that dt=0, and as the value of $\theta$ approaches 225°, the relative phase shift between E1 and E2 approaches a maximum of 180° and dt approaches 1 msec. Under these conditions it follows that a count of N=0 may represent $\theta=45°$ and that a count of N=4000 may represent $\theta=225°$.

Figure 11:
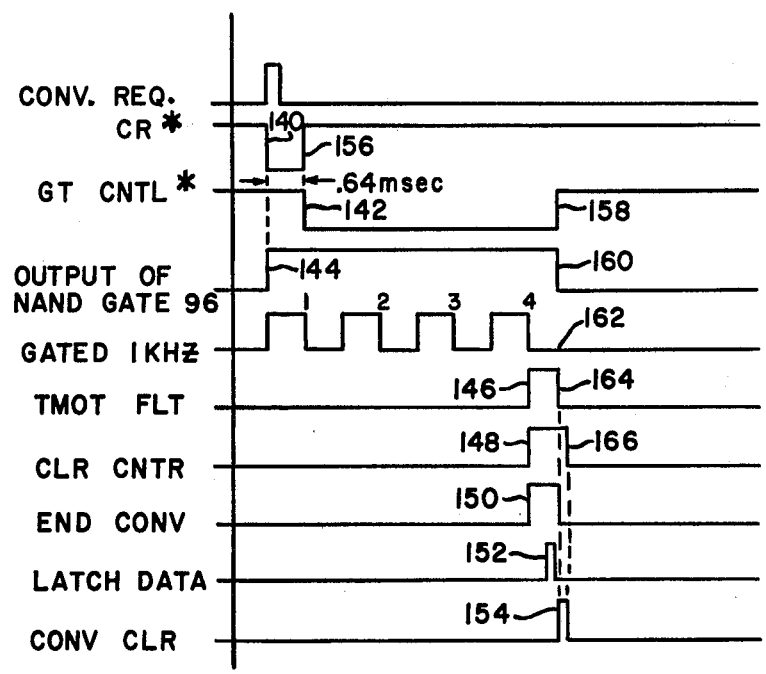
FIGS. 11 and 12 are waveform diagrams of signals at various points in applicants' resolver processor as it responds to resolver terminal failure conditions.

If a failure condition, such as short or open circuit condition of any of the resolver terminals results in the absence of the START signal, then applicants' fault detector 94 generates a warning signal regardless of whether a STOP signal subsequently appears at the CK input of flip-flop 84. This operation is hereinafter described with reference to FIG. 8 and to the waveform diagram of FIG. 11. As previously described, the resolver conversion control circuit 60 responds to a CONV REQ pulse by causing the normally high CR* signal to toggle low as at 142. The high-to-low transition of the CR* signal causes the output of NAND gate 96, which is connected to a first input of AND gate 98, to toggle high as at 144. Since a 1 KHz signal is applied to the second input of AND gate 98, the low-to-high transition of the signal applied to the first input causes a gated 1 KHz signal to appear at the output of AND gate 98 and at be applied to the A input of counter 100. Due to the nature of counter 100, its QC output signal, hereinafter designated the TMOT FLT signal, toggles low to high as at 146 upon the fourth negative transition of the gated 1 KHz signal applied to its A input. This state change of the TMOT FLT signal causes similar state changes of the CLR CNTR signal, as at 148 via OR gate 102, and of the END CONV signal, as at 150 via OR gates 104 and 106. This 0 to 1 transistion of the CLR CNTR signal clears the contents of counter 90 to N=0. The 0 to 1 transition of the END CONV signal causes flip-flop 70 and AND gate 72 of conversion control circuit 60 to generate, in the manner previously described, a LATCH DATA pulse, as at 152, delayed with respect to the 0 to 1 transition of the END CONV signal. This LATCH DATA pulse is applied to the CLK input of data latch 92, thus causing the contents N=0 of counter 90 to be latched into data latch 92. In this case the number N=0 is latched into data latch 92 because the CLR CNTR signal at 148 precedes the LATCH DATA pulse at 152. As previously mentioned, the number N=0 normally represents the angle $\theta=45°$. However, in this "no START" signal situation, N will be zero regardless of the true angular position of the resolver 14. To insure that this failure condition is recognized as such, the angle range of the resolver 14 must be further limited so that the relative angle $\theta$ between coils 18 and 24 is greater than 45° and less than 225°. Further analysis of the system would show that a short circuit of the resolver terminal 32 to electrical ground would force the resolver processor to indicate a 180° resolver position regardless of the true angular position. Similarly, a short circuit of the resolver terminal 26 to ground would force the resolver processor to indicate a 90° resolver position regardless of its true angular position. By limiting the acceptable angular position of shaft 15 with stops 31 and 33 to between 90° and 180°, as shown in FIG. 1, then a final count indicating an angle outside of this range is not possible under non-failure conditions. Thus, a final count of N=0 may be recognized as representing a failure condition, and in particular, it may represent the "NO START" signal situation just described.

As previously described, the transition of the END CONV signal at 150 also causes flip-flop 70 and AND gate 74 to generate a CONV CLR pulse, as at 154, delayed with respect to the LATCH DATA pulse. And, as described previously, the CONV CLR signal causes the GT CNTL* signals to toggle back to its original logic 1 levels, as at 158, which causes the output of NAND gate 96 to return to logic 0, as at 160, thus shutting off the gated 1 KHz signal at the output of AND gate 98, as at 162. The CONV CLR signal is also aplied to the CLR input of counter 100 which causes the TMOT FLT signal at the QC output of counter 100 to return to the logic 0 level, as at 164. When both the CONV CLR and TMOT FLT signals have returned to logic 0, then the CLR CNTR signal at the output of OR gate 102 returns to logic 0, as at 166. At this point, the fault detector 94, having forced the angle representation N outside the permissible range, is once again ready to detect a failure condition when triggered by a CONV REQ pulse.

Figure 12:
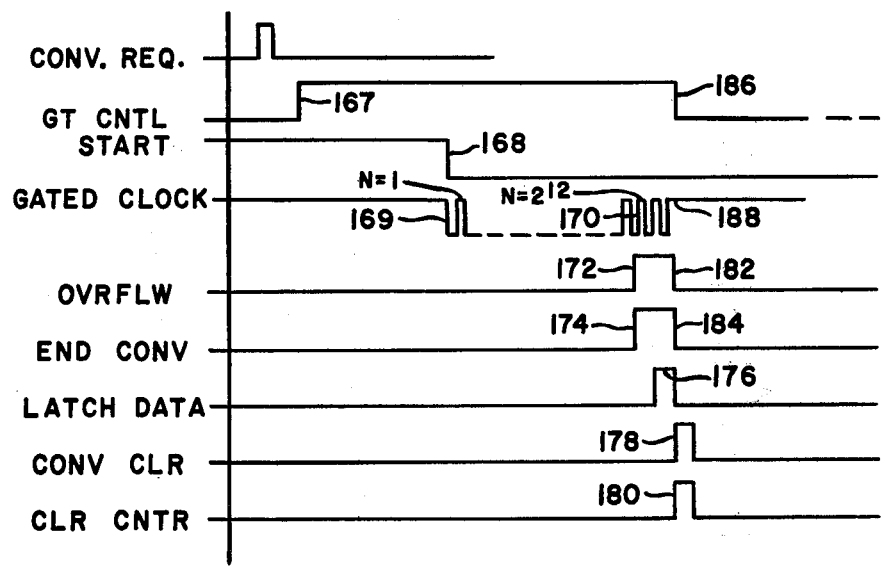

A resolver terminal failure condition may also result in the generation of a START signal, with the absence of a following STOP signal. This situation is illustrated in part by the waveform diagram of FIG. 12. Once again, resolver conversion control circuit 60 causes a 0 to 1 transition of the GT CNTL signal as at 167 in response to the CONV REQ pulse. This transition of the GT CNTL signal enables count control circuit 80 to respond to the next START signal as at 168 by starting the 4 MHz GATED CLOCK as at 169, just as in the normal operation described previously. Counter 90 then begins to count at the 4 MHz rate of the GATED CLOCK signal, also just as previously described. However, in order to stop counter 90 from counting, a STOP signal must be applied to flip-flop 84 of count control circuit 80 to shut off the GATED CLOCK signal at the output of AND gate 86. Therefore, without a STOP signal the counter 90 continues to count, as shown in FIG. 12, until 4096 cycles of the GATED CLOCK signal have occurred, as at 170, at which point the contents of counter 90 attains the number N=4096, and at wich point the OVRFLW signal from counter 90 toggles from 0 to 1 as at 172. The 0 to 1 state change of the OVRFLW signal causes a similar state change in the END CONV signal as at 174 via OR gates 104 and 106. Once again, as previously described with respect to resolver conversion control circuit 60, this state change of the END CONV signal causes a LATCH DATA pulse to appear at the output of AND gate 72, as at 176, and a short time later, causes a CONV CLR pulse to appear at the output of AND gate 74, as at 178. The LATCH DATA pulse latches the contents of counter 90, into data latch 92. Since only 12 bits of counter data go to the data latch 92, the actual count transferred to the data latches will be zero (the most significant bit representing 4096 will not be transferred). This zero count will again be recognized as representing a failure condition. In this case, it represents the condition wherein a START signal is not followed by a STOP signal.

After the number zero is latched into data latch 92, the 0 to 1 transition CONV CLR pulse causes a similar state change of the CLR CNTR signal as at 180 via OR gate 102. The CLR CNTR signal then clears the contents of counter 90 to N=0 thus causing the OVRFLW signal to return to a logic 0 state as at 182. This 1 to 0 transition of the OVRFLW signal causes a similar transition of the END CONV signal back to its original logic 0 level via OR gates 104 and 106, as at 184. The positive transition of the CONV CLR pulse at 178 is again applied to the CLR input of counter 66 which causes the GT CNTL signal to return to its original 0 level as at 186. The 1 to 0 transition of the GT CNTL signal is applied to an input of NAND gate 86 thereby holding the output of NAND gate 86 constant at the logic 1 level and thus terminating the GATED CLOCK signal as at 188. At this point, the fault detector 94 and the remainder of resolver processor 16 are once again in condition to perform another angle measurement in response to a new CONV REQ pulse.

We claim:

1. A processor for converting the angular position of a resolver into a digital representation thereof in response to a conversion request, wherein the resolver generates a pair of resolver signals as a function of the angular position of the resolver and valid resolver signals are limited to a predetermined range of angular position by physically restraining the resolver rotation to said range, said processor comprising:

means, responsive to the resolver signals, for generating a pair of phase shifted signals with a relative phase shift proportional to the resolver angle;

means for converting the relative phase shift between said phase shifted signals to said digital representations of the resolver angle; and means for indicating fault conditions in the resolver signals by generating digital representations of angular positions outside said predetermined range.

2. The processor of claim 1, wherein:

said phase shifted signal generating means includes means for generating a leading signal in response to one of the resolver signals, and means for generating a lagging signal in response to the other of the resolver signals, the relative time delay between the leading and lagging signals indicative of said relative phase shift between the phase shifted signals; and said converting means including a counter, means for enabling the counter in response to the leading signal and means for inhibiting the counter in response to the lagging signal so that the contents of the counter represents the relative phase shift.

3. A processor as defined in claim 1, wherein:

said predetermined range is for resolver angles greater than 45° and less than or equal to 225°.

4. A processor as defined in claim 1, wherein:

said predetermined range is for resolver angles greater than 90° and less than or equal to 225°.

5. The resolver processor of claim 2, further comprising:

means for generating an overflow signal when the contents of the counter overflows when no lagging signal inhibits the counter after the counter has been enabled by a leading signal, said fault indicating means being responsive to said overflow signal to generate a digital representation of an angular position outside said predetermined range.

6. The resolver processor of claim 5, further comprising:

storage means for storing the digital representations contained in the counter in response to a latch signal.

7. The resolver processor of claim 6, further comprising:

means for generating said latch signal followed by a clear signal when the leading signal and the lagging signal are in selected states.

8. The resolver processor of claim 2, said fault indicating means further comprising:

means responsive to the conversion request for generating an error signal when no leading signal occurs within a predetermined time interval after the conversion request.

9. The resolver processor of claim 8, said fault indicating means further comprising:

means responsive to the error signal for generating a clear signal to said counter followed by a latch signal, said clear signal clearing the contents of said counter to zero wherein such number is a digital representation of an angular position outside said predetermined range.

10. The resolver processor of claim 9, further comprising:

storage means for storing the angle representations contained in the counter in response to the latch signal.

11. A processor as efined in claim 3, wherein:

said representation of a resolver angle outside said predetermined range is a representation of a resolver angle of 45°.

12. A processor as defined in claim 3, wherein:

said representation of a resolver angle outside said predetermined range includes a representation of a resolver angle of 90°.

13. A processor as defined in claim 4, wherein:

said predetermined range is for resolver angles greater than 90° and less than 180°.

14. A processor as defined in claim 13, wherein:

said representations of a resolver angle outside said predetermined range includes a representation of resolver angle of 180°.

15. A processor as defined in claim 14, wherein:

said representations of a resolver angle outside said predetermined range includes a representation of a resolver angle of 45°.

16. A resolver processor system comprising:

an angle resolver physically restrained to move between angles of $\theta$ greater than 90° and less than 180°, said resolver generating a pair of resolver signals, $V \sin(2\pi ft) \cos\theta$, $V \sin(2\pi ft) \sin\theta$, where V is the amplitude of the resolver signals, f is the frequency of the resolver signals, and $\theta$ is the angular position of the resolver;

means, receiving said resolver signals, for generating a pair of phase shifted signals, $V \sin(2\pi f - 45° + \theta)$, $V \sin(2\pi f + 45° - \theta)$, from said resolver signals, said phase shifted signals having a time delay between their zero crossings proportional to said phase shift and said angular position;

means for detecting the zero crossing of one of said phase shifted signals and for generating a start signal in response thereto;

means for detecting the zero rossing of the other of said phase shifted signals and for generating a stop signal in response thereto;

a counter with a clock input, clear input, an overflow output, and counter outputs, said counter operably incremented by a clock signal applied to its clock input and cleared by a clear signal applied to its clear input;

count control means enabled in response to a conversion request for gating said clock signal to said counter in response to said start signal, for inhibiting said clock signal to said counter in response to said stop signal, and for generating a conversion finish signal in response to said sto signal only when preceeded by a start signal, wherein the output of said counter is a digital representation of the phase shift between the two phase shifted signals and proportional to $\theta$;

said digital counter having a minimum or zero count assigned to conditions where said phase shifted signals are in phase and a maximum count assigned to conditions where said phase shifted signals are 180° out of phase, wherein said restrained resolver angles define a predetermined range of valid digital representations of said counter;

a data latch connected to the outputs of said counter for holding the digital representations of the counter, said latch having a clock input and being operable to transfer said digital representations from said counter outputs to said latch in response to a latch signal applied to its clock input;

means responsive to a conversion finish signal for generating a latch signal to said latch and, after said latch receives said digital representation, for then generating a clear signal to said counter;

means for generating said conversion finish signal in response to an overflow signal from the counter overflow output when no stop signal inhibits the counter after the counter has been gated by a start signal, wherein said data latch contains a digital representation which is outside said predetermined range and is an indication of a fault condition; and means for generating clear signal to said counter and thereafter said conversion finish signal when no start signal occurs within a predetermined time interval after said conversion request, wherein said data latch contains a digital representation which is outside said predetermined range and is an indication of a fault condition.

* * * * *